United States Patent Office 3,260,105
Patented July 12, 1966

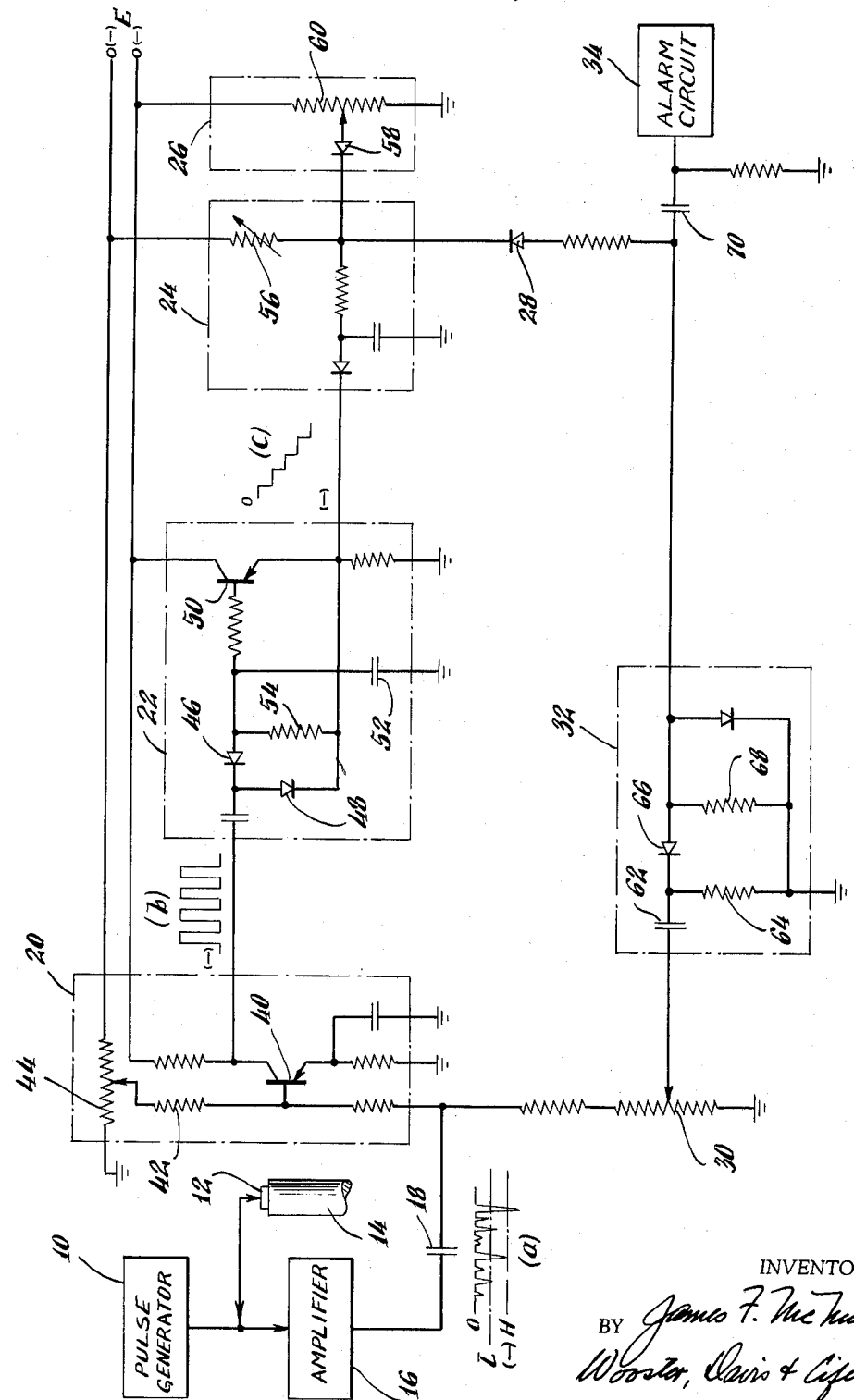

3,260,105
ULTRASONIC TESTING APPARATUS AND METHOD

James F. McNulty, Westbury, N.Y., assignor to Automation Industries, Incorporated, El Segundo, Calif., a corporation of California
Filed Dec. 21, 1962, Ser. No. 246,517
16 Claims. (Cl. 73—67.9)

This invention relates to ultrasonic testing apparatus and, more particularly, to such apparatus capable of separating defect signals from noise and from signals caused by coarse grain structure.

Ultrasonic testing is a widely used method for testing metallic parts for internal and external defects. The basic method is disclosed in U.S. Patent No. 2,280,226 which issued April 21, 1942, to F. A. Firestone. Basically, ultrasonic testing is performed by applying to a piezoelectric crystal transducer periodic electrical pulses of ultrasonic frequency. The crystal vibrates at the ultrasonic frequency and is mechanically coupled to the surface of the specimen to be tested. This coupling may be effected by immersion of both the transducer and the specimen in a body of liquid or by actual contact through a thin film of a liquid such as oil. The ultrasonic vibrations pass through the specimen and are reflected by any discontinuities which may be encountered. The echo pulses that are reflected are received by the same or by a different transducer and are converted into electrical signals which indicate the presence of the defect. In one application of ultrasonic testing, the initial pulses and the echo signals are both applied to the vertical plates of a cathode ray oscilloscope which has a horizontal sweep period corresponding to the pulse repetition period. In this manner, the defects in the specimen may be visually observed.

While visual monitoring is suitable in a great many applications, it is not always desired. It will be readily apparent that a member of echo signals may be received from a test specimen which are not necessarily indicative of faults. For example, lower grade forgings and castings frequently contain numerous air or gas pockets or non-metallics scattered throughout their cores. These pockets and non-metallics cause ultrasonic reflections comparable to those produced by small cracks and defects but are usually not otherwise objectionable. Thus, a great deal of skill and training is often required to correctly interpret the oscilloscope reading. For many applications, therefore, it is desirable to provide an automatic alarming system which does not give visual indications or which may give visual indications only secondarily. Ideally, such systems should be usable by unskilled personnel in asembly-line type operations or in field testing and should provide a "go, no go" indication. In other words, the tested specimen should be either indicated as sound or unsound.

In certain ultrasonic testing fields the above results have been achieved by prior art apparatus. For example, several averaging or integrating type circuits have been employed in attempts to solve this problem. However, these prior art apparatus have not always been capable of coping with certain problems which have arisen due to the wide variety of possible signal presentation from various types of defects as well as various noise patterns. One of these problems lies in the area of ultrasonic testing of axles, such as railroad axles. In axle testing primary consideration is given to the soundness of the exterior surface and of the metal lying just below the surface. The more centralized portions of the axle are less important. This will be understood when it is realized that the mechanical strength of the axle arises from this outer portion and, in fact, many axles are hollow. It is not uncommon to find perfectly safe axles which have throughout the inner portion a high degree of porosity and coarse grain structure (or "segregation") giving rise to relatively high level noise signals. Furthermore, it will be understood that axles will normally be tested by unskilled personnel under nonuniform service conditions. For example, such tests should desirably be performed in the railroad yard by rugged, easily portable testing devices. The problem which has thus been presented to the prior art and which it has so far failed to solve is that of providing ultrasonic testing apparatus which is capable of isolating true defect signals from segregation or grain structure signals and providing an alarm signal in response thereto.

It is, therefore, the primary object of this invention to provide an improved testing apparatus.

Other objects are to provide such an apparatus which is capable of isolating defect signals from high level noise signals and which is capable of providing an alarm upon the occurrence of such a defect signal. The manner in which these objects are accomplished will be more apparent from the following description, the appended claims, and the single figure of the attached drawing which shows in block and schematic form the circuit of an apparatus constructed in accordance with this invention.

In the drawing there is illustrated a pulse generator 10 of a type which is well known in the prior art. This pulse generator generates periodic electrical pulses of ultrasonic frequency which are applied to a piezoelectric crystal transducer 12 coupled to a specimen 14, such as an axle. Ultrasonic vibrations are initiated in specimen 14 by the vibration of the transducer 12 and echoes originate at the various boundaries encountered by the internal ultrasonic signal. These echoes are retransformed into electrical signals by transducer 12 and are amplified by the amplifier 16. The electrical echo signals are then passed via a suitable coupling capacitor 18 to the circuit of this invention. The signal from amplifier 16 is passed into two separate channels and the output is a function of the combined operations performed in the two channels. One such channel comprises a slicer circuit 20, a counter 22, a storage circuit 24, a limiter 26 and a positive blocking diode 28. The parallel channel includes an alarm level potentiometer 30. Both channels feed a comparator circuit 32. The output of the comparator circuit 32 passes to a suitable alarm circuit 34.

The circuit of this invention may be briefly described as a circuit for automatically adjusting the signal reject level in accordance with the number and amplitude of the signals that are present. The circuit is thus able to discriminate between signals caused by cracks and signals caused by very coarse grain structure. The system is also capable of discriminating against non-recurrent noise bursts.

To aid in understanding the operation of this invention, wave form diagrams (a), (b) and (c) are included to illustrate the wave shape present at each of various portions of the circuit. Thus it will be noted from diagram (a) that the exemplary input to the circuit is a relatively noisy video signal, including four peaks of substantial height. This signal is applied both to the slicer circuit 20 and to the alarm level potentiometer 30. The slicer circuit 20 includes a transistor 40 connected as an amplifier with its base connected through a resistor 42 to a "threshold" potentiometer 44. This circuit accepts all signals exceeding a preselected amplitude ("L" of diagram (a)) and clips off all signals exceeding a second preselected amplitude level ("H"). The selected signals are then amplified to the proper level for operation of counter circuit 22. The output of the slicer circuit 20 is illustrated in diagram (b) and represents the amplified pulses of diagram (a) selected between the levels L and H.

The output of slicer circuit 20 is applied to the counter circuit 22. The counter employed in the described embodiment is a standard storage type diode counter having two diodes 46, 48, a transistor 50 and a smoothing capacitor 52. This type counter is both reliable and simple. However, counters of this type normally have two objectionable characteristics. First, the output is amplitude-sensitive and, second, the output is nonlinear, with each succeeding pulse producing a step considerably smaller than the previous step. In the present embodiment, these objections are overcome by the previously described slicer circuit 20 which eliminates the amplitude sensitivity problem and by connecting transistor 50 as a boot-strap type emitter-follower, the emitter being connected to the input via diode 48 and resistor 54. The counter 22 is thus caused to produce a staircase type output, as shown in diagram (c), with each step representing one input pulse. In an exemplary embodiment of the invention, each step was found to be within ten percent of the amplitude of all other steps. The time constant of the counter circuit corresponds to a few (e.g., three or four) pulse periods so that it continually resets itself in the absence of recurrent defect signals.

Up to this point we have been considering the echo signals produced by a single pulse. As previously pointed out, an ultrasonic testing apparatus provides periodic pulses. For this reason, a storage circuit 24 is provided which averages the peak output of the counter circuit 22 over several peak periods. Storage circuit 24 is a diode coupled R.C. circuit which has a discharge time constant much larger than its charging time constant. The circuit charges to the peak counter output during each sweep period, but cannot discharge in less than five or ten sweep periods. The output of storage circuit 24 is thus a D.C. potential proportional to the peak output of counter circuit 22 averaged over several sweep periods. It will also be noted that any non-recurrent noise received during a single sweep period will be averaged out and will have essentially no effect on the system operation.

As it is not desirable to change the alarm level of the system in the presence of only one or two signals, a small adjustable voltage of opposite polarity from the counter output is applied to the storage circuit through the adjustable resistor 56. This voltage can be adjusted to cancel the first few selected output pulses from the counter. If more pulses of proper amplitude are present, the output of the counter will set a higher alarm level, as described below. In addition, a limiter circuit 26 comprising a back-biased diode 58 and a potentiometer 60, is provided to limit the output of storage circuit 24. This permits an alarm on a certain preselected high signal level regardless of how many pulses are received. In many applications this limiter circuit may be eliminated.

The D.C. outut of the storage circuit 24 is connected through the positive blocking coupling diode 28 to the comparator circuit 32. The comparator circuit also receives the video signal of diagram (a) as attenuated by the potentiometer 30. The input signal to comparator 32 is reference to ground by capacitor 62 and resistor 64. The diode 66 is tied to ground through resistors 64 and 68. The D.C. signal from diode 28 sets the reject level of diode 66 so that only that portion of the video input signal which exceeds such amount will pass to the alarm circuit 34. If there is no output from storage circuit 24, the comparator will pass all incoming video signals and will permit alarming at a level perset in the alarm circuit 34. It will thus be seen that the comparator circuit, in effect, shifts the alarm level to progressively higher values in accordance with the number of input pulses received. The signal that is passed to the alarm circuit 34 as the result of a defect is repeated with each pulse produced by pulse generator 10. Accordingly, the alarm will respond to this sequence of D.C. pulses. However, a single noise "burst" from some other cause will not result in actuation of the alarm.

Alarm circuit 34 is a standard circuit utilizing a thyristor and an indicator light display. The alarm is coupled to the output of comparator circuit 32 through a D.C. blocking capacitor 70. Each pulse from the pulse generator 10 actuates the thyristor to its "off" position and the alarm circuit remains off until triggered to the "on" position by a video pulse from comparator circuit 32. The initial pulse from generator 10 resets the thyristor to the "off" position at the beginning of each cycle.

It will be noted that the circuit of this invention is simple, compact, and reliable. Only two transistors and seven diodes are used in the illustrated embodiment. Apparatus employing the circuit of this invention have been found to give excellent results in "go, no go" types of testing without the necessity of visual display and without complicated panel controls. It will be readily understood that many uses exist for the circuit of this invention, and also that many variations and modifications of the circuit will be apparent to those skilled in the art. Accordingly, the invention is not limited to the circuit specifically described herein, but is limited only by the scope of the following claims.

What I claim as new and desire to secure by Letters Patent of the United States is:

1. The method of testing which comprises: directing periodic vibrational pulses of ultrasonic frequency into an object under test; receiving vibrational echoes of portions of said pulses from said object; transforming said vibrational echoes into corresponding electrical signals; establishing a signal reject level proportional to the number of electrical signals exceeding a preselected amplitude level; passing only those portions of said electrical signals in excess of said signal reject level; and actuating an alarm by said passed portions.

2. The method of testing which comprises: directing periodic vibrational pulses of ultrasonic frequency into an object under test; receiving vibrational echoes of portions of said pulses from said object; transforming said vibrational echoes into corresponding first electrical signals; selecting from said first electrical signals those having amplitudes in excess of a preselected first level and rejecting that portion of each selected signal in excess of a preselected second level; forming from the selected signals within a pulse period an intermediate signal substantially proportional to the integral of all such selected signals within said pulse period; forming from a plurality of successive intermediate signals a D.C. signal substantially proportional to the value of said intermediate signals averaged over a plurality of pulse periods; comparing said D.C. signal with said first electrical signals; and providing an output signal proportional to the amount by which any of said first electrical signals exceeds said D.C. signal.

3. Ultrasonic testing apparatus which comprises: means for directing periodic vibrational pulses of ultrasonic frequency into an object under test; transducer means positioned to receive vibrational echoes of portions of said pulses from said object and transforms said echoes into corresponding first electrical signals; electrical circuit means in receiving relationship to said first electrical signals and arranged to establish a signal reject signal proportional to the number of first electrical signals exceeding a preselected amplitude level; and comparator means in receiving relationship to said first electrical signals and responsive to said signal reject signal to provide an electrical output proportional to only those portions of said first electrical signals in excess of said signal reject signal.

4. The apparatus of claim 3 wherein said electrical circuit means comprises: a storage type counter connected to receive said first electrical signals and provide a plurality of second electrical signals each substantially proportional to the integral of said first signals within a pulse period; and an averaging circuit connected to receive said second electrical signals and provide said signal reject signal substantially proportional to the average of said second signals over a plurality of pulse periods.

5. The apparatus of claim 4 wherein said comparator means comprises a diode connected to be biased by said signal reject signal.

6. The apparatus of claim 4 wherein said averaging circuit comprises an R-C circuit diode-coupled to the output of said counter having a charging time constant shorter than said pulse period and a discharge time constant greater than said pulse period.

7. The apparatus of claim 6 wherein said averaging circuit includes biasing means connected to establish an output amplitude threshold from said averaging circuit.

8. The apparatus of claim 7 wherein said comparator means comprises a diode connected to be biased by said signal reject signal.

9. Ultrasonic testing apparatus which includes the combination of
 first means for transmitting pulses of ultrasonic energy into an object under test and receiving echoes of the energy reflected from within the object, said first means being effective to produce signals that are a function of the echoes,
 second means coupled to the first means and responsive to the amplitudes of the echo signal, said second means being effective to produce a reject signal that is a function of the number of echo signals that exceed a threshold level, and
 third means coupled to the first and second means and responsive to the reject signal and the portions of the echo signals which are greater than the reject signal.

10. Ultrasonic testing apparatus which includes the combination of
 first means for transmitting pulses of ultrasonic energy into an object under test and receiving echoes of the energy reflected from within the object, said first means being effective to produce signals that are a function of the echoes,
 second means coupled to the first means and responsive to the amplitudes of the echo signal, said means being effective to produce a reject signal that is a function of the number of echo signals that exceed a predetermined threshold level,
 a signal comparator coupled to the second means and responsive to the reject signal, said comparator being coupled to the first means and responsive to the echo signals and effective to pass only the portions thereof which exceed the reject signal.

11. Ultrasonic testing apparatus which includes the combination of
 first means for transmitting pulses of ultrasonic energy into an object under test and receiving echoes of the energy reflected from within the object, said means being effective to produce signals that are a function of the echoes,
 counting means coupled to the first means and having a threshold level, said counting means being responsive to the amplitudes of the echo signals and effective to accumulate a count that is a function of the number of echo signals that exceed the threshold level,
 reject means coupled to the counting means and responsive to the accumulated count, said reject means being effective to form a reject signal that is a function of the accumulated count, and
 indicating means coupled to the foregoing means and responsive to the reject signal, said indicating means being effective to provide an indication that is a function of the echo signals which exceed the reject signal.

12. Ultrasonic test apparatus which includes the combination of
 first means for transmitting pulses of ultrasonic energy into an object under test and receiving echoes of the energy reflected from within the object, said means being effective to produce echo signals that are a function of the echoes,
 second means coupled to the first means and having a threshold level, said second means being effective to only pass the portions of the echo signals that exceed the threshold level,
 third means coupled to the second means and effective to count the number of said portions that are passed by the second means, said third means being effective to provide a reject signal having an amplitude that is a function of said number, and
 fourth means coupled to the first and third means and responsive to the reject signal, said fourth means being effective to provide an output signal that is a function of the portion of the echo signal that is greater than the reject level.

13. Ultrasonic test apparatus which includes the combination of
 first means for transmitting pulses of ultrasonic energy into an object under test and receiving echoes of the energy reflected from within the object and providing a signal that is a function of the received echoes,
 a pulse generator coupled to the first means to trigger the first means whereby a plurality of pulses are transmitted during a predetermined time interval,
 second means coupled to the first means and having a threshold level, said second means being effective to only pass the portions of the echo signals that exceed the threshold level,
 third means coupled to the second means and effective to provide a reject signal having an amplitude that is a function of the number of the portions that exceed the threshold level during the predetermined time interval, and
 fourth means coupled to the first and third means and responsive to the reject signal, said fourth means being effective to provide an output signal that is a function of the portion of the echo signal that is greater than the reject signal.

14. Ultrasonic test apparaus which includes the combination of
 first means for transmitting pulses of ultrasonic energy into an object under test and receiving echoes of the energy reflected from within the object and provide an echo signal corresponding thereto,
 a pulse generator coupled to the first means to trigger the first means at a determined rate whereby the pulses have at least a predetermined time interval therebetween,
 second means coupled to the first means and having a threshold level, said second means being effective to only pass the portions of the echo signals that exceed the threshold level,
 third means coupled to the second means and effective to count the number of said portions that are passed by the second means during each time interval to provide a count signal having an amplitude that is a function of the number of echo signals passed during the interval,
 fourth means coupled to the third means and responsive to the count signal to provide a reject signal that is a function of the average of the count signal during a predetermined number of said intervals, and
 fifth means coupled to the first and third means and responsive to the reject signal, said fifth means being effective to provide an output signal that is a function of the portion of the echo signal that is greater than the reject level.

15. Ultrasonic test apparatus for inspecting a test object having a major target and a plurality of minor targets, said apparatus including the combination of
 first means for being coupled to the test object and transmitting pulses of ultrasonic energy into the object, said means being effective to receive echoes of the energy reflected from the targets within the object and to produce echo signals corresponding to the received echoes, said signal including low amplitude portions corresponding to the minor targets and in a low amplitude range and a large amplitude portion that is above said range and corresponding to the major target;

second means coupled to the first means and having a threshold level that corresponds to the lower level of said range, said second means being effective to only pass the portions of the echo signals that exceed the threshold level, counting means coupled to the second means and effective to count the number of low amplitude portions that are passed by the second means and provide a reject signal having an amplitude that is a function of said number and corresponds to the upper level of said range, and output means coupled to the first and third means and responsive to the reject signal, said output means being effective to provide an output signal that is a function of the portion of the echo signal that is greater than the reject level and corresponds to a major target.

16. Ultrasonic test apparatus for inspecting a test object having a major target and a plurality of minor targets, said apparatus including the combination of first means for being acoustically coupled to the test object for transmitting pulses of ultrasonic energy into the object whereby echoes of the ultrasonic energy are reflected from the targets, a pulse generator coupled to said means to transmit the pulses at a predetermined rate whereby the pulses have at least a predetermined time interval therebetween, said first means being effective to receive the echoes from the targets and produce an electrical signal following the transmission of each ultrasonic pulse, the section of said signal between the successive transmitted pulses including low amplitude portions corresponding to the minor targets and in a low amplitude range, said section also including a high amplitude portion that exceeds said range and corresponds to the major target, second means coupled to the first means and having a threshold level corresponding to the bottom of said range, said second means being effective to only pass the portions of the echo signals that exceed the threshold level, counting means coupled to the second means and having a time constant that is less than the time interval, said counting means being effective to count the portions that are passed by the second means to provide count signals having amplitudes that are a function of the number of echo signals in the low amplitude range passed during the interval, fourth means coupled to the counting means and responsive to the count signal to provide a reject signal that corresponds to the top of said range and is a function of the average amplitude of the count signals during a predetermined number of said time intervals, and fifth means coupled to the first means and the counting means and responsive to the reject signal, said fifth means being effective to provide an output signal that is a function of the portion of the echo signal that is greater than the reject level.

References Cited by the Examiner
UNITED STATES PATENTS 2,821,702  1/1958  Russell _____ 328—146 X
3,133,438  5/1964  Erdman _____ 73—67.9

FOREIGN PATENTS 886,972  1/1962  Great Britain.

NEIL C. READ, *Primary Examiner.*

R. M. ANGUS, D. YUSKO, *Assistant Examiners.*